United States Patent [19]

McKaughan et al.

[11] Patent Number: 5,802,305

[45] Date of Patent: Sep. 1, 1998

[54] SYSTEM FOR REMOTELY WAKING A SLEEPING COMPUTER IN POWER DOWN STATE BY COMPARING INCOMING PACKET TO THE LIST OF PACKETS STORING ON NETWORK INTERFACE CARD

[75] Inventors: Robert M. McKaughan, Bellevue; Forrest Foltz, Woodinville; Rajasekhar Abburi, Bellevue, all of Wash.

[73] Assignee: Microsoft Corporation, Redmond, Wash.

[21] Appl. No.: 649,452

[22] Filed: May 17, 1996

[51] Int. Cl.$^6$ .................................................. G06F 1/32
[52] U.S. Cl. ............................ 395/200.57; 395/750.02
[58] Field of Search ....................... 340/146.2; 370/403, 370/401; 375/222; 707/10; 395/750.02, 182.02, 200.57; 711/141

[56] References Cited

U.S. PATENT DOCUMENTS

| | | | |
|---|---|---|---|
| 5,059,942 | 10/1991 | Burrows | 340/146.2 |
| 5,136,580 | 8/1992 | Videlock et al. | 370/403 |
| 5,202,899 | 4/1993 | Walsh | 375/222 |
| 5,404,505 | 4/1995 | Levinson | 707/10 |
| 5,404,544 | 4/1995 | Crayford | 395/750.02 |
| 5,581,704 | 12/1996 | Barbara et al. | 711/141 |
| 5,640,504 | 6/1997 | Johnson, Jr. | 395/182.02 |
| 5,657,314 | 8/1997 | McClure et al. | 370/401 |

OTHER PUBLICATIONS

Magic Packet™ Technology, White Paper, Version 1.2, Oct. 20, 1995.

*Primary Examiner*—Thomas C. Lee
*Assistant Examiner*—David Ton
*Attorney, Agent, or Firm*—Jones & Askew, LLP

[57] ABSTRACT

In a computer network including a plurality of interconnected computers, one of the computers being a sleeping computer in a power down state, the sleeping computer having a list of packets to listen for stored on a network interface card associated with the sleeping computer, a method of waking the sleeping computer from the computer network. An incoming packet of information is transmitted from one of the computers in the network to the sleeping computer. When the network interface card of the sleeping computer detects the incoming packet, it compares the incoming packet to the list of packets stored on the network interface card. If the incoming packet matches one of the packets in the list of packets stored on the network interface card, or if the incoming packet is directly addressed to the sleeping computer, then a signal is issued to wake the sleeping computer. Otherwise, the incoming packet is discarded and the sleeping computer is not awaken.

17 Claims, 3 Drawing Sheets

SYSTEM FOR REMOTELY WAKING A SLEEPING COMPUTER IN POWER DOWN STATE BY COMPARING INCOMING PACKET TO THE LIST OF PACKETS STORING ON NETWORK INTERFACE CARD

TECHNICAL FIELD

This invention relates generally to network computing systems, and more particularly, to an improved method and system for remotely waking a computer from a network.

BACKGROUND OF THE INVENTION

Computer networks are commonly used in offices or corporate environments to interconnect personal computers. Well-known local area networks (LANs), such as Ethernet, Token Ring and ARCnet, are widely used to connect a group of computers and other devices that are dispersed over a relatively limited area, such as an office or building, and new LANs continue to be developed. These local area networks provide an efficient and economical way for personal computers to share information and peripherals.

Of course, computer networks are not limited to the confines of an office or building. Smaller networks are commonly interconnected into wide area networks (WANs), such as the Internet, to provide a communications link over a larger area. The Internet is actually a collection of networks that share the same namespace and use the TCP/IP protocols. Originally developed for the military in 1969, the Internet now connects over four hundred networks and tens of thousands of nodes in over forty-two countries. It is estimated that the Internet is now accessed by more than 10 million people every day, and that perhaps as many as 25 million people have access to the Internet.

As is well known in the art, the transmission of data packets across networks is governed by a set of rules called "transport protocols." In order for two computers in a local area network to communicate with one another, each computer must use the proper transport protocol for the particular network. During the last decade, many different transport protocols have evolved for different networks. For example, TCP/IP is the transport protocol widely used in UNIX-based networks and with Ethernet 802.3 LANs; IPX/SPX is the transport protocol used by Novell Corporation's NetWare software; NetBEUI is the local-area transport protocol developed by IBM to operate underneath Microsoft's NetBIOS network interface; DECnet is the transport protocol used by Digital Equipment Corporation for linking computer systems to DECnet-based networks; AppleTalk is the transport protocol developed by Apple Computer, Inc. for linking computer systems to Apple Macintosh network systems; and XNS is the transport protocol developed by Xerox Corporation that was used in early Ethernet networks. These transport protocols, which are all well known in the art, are often implemented as drivers which can be loaded into and out of a computer system.

In order to connect to a network, a computer is usually provided with one or more network interface cards that provide a data link to the network. Each network interface card has a unique address, referred to herein as its "destination address," which enables each computer to be individually addressed by any other computer in the network. The destination address is typically, but not always, a 12x digit number (e.g., 00AA00123456) that is programmed into memory located on the network interface card and is generally hidden from the user's view.

The destination address of a computer is analogous to a person's social security number in that, although every person in the country is assigned a unique social security number, it is generally not known to other people and rarely used in normal communications. Likewise, the destination address of a computer is a more primitive means of identifying the computer, and users are not expected to know and remember the destination address of every computer in the network. Instead, every computer generally has a computer name (commonly corresponding to the user's name and/or machine location) that is more widely known. When a user desires to send a message to another computer, the transport protocol in the network is responsible for converting the computer name into the corresponding destination address to establish a communications link between the two computers.

Because wide area networks often include a collection of a wide variety of machines, organizations and individuals, these networks must provide the means to exchange data between dissimilar machines and across many different transport protocols. To accomplish this, each transport protocol has its own layer of addressing information that enables it to exchange electronic mail, data files, programs, etc. between one LAN and another LAN. As a data packet is transmitted across different networks, the addressing information for one transport protocol is layered upon the addressing information for the next transport protocol.

Therefore, the address of an individual, computer, or organization on the Internet has several layers or components including the domain name or user name, the underlying identifiers used by the transport protocol(s) that govern the data exchange, and the actual destination address. Each transport protocol is designed to extract the appropriate destination address to ensure that each message packet is routed to its intended recipient.

To illustrate the distinctions between the various layers of addressing information, consider an individual computer user in Atlanta that wishes to send an e-mail message to a destination computer in Seattle where the computer in Atlanta is connected to an Internet service provider and the computer in Seattle is connected to a corporate local area network. Generally, the user in Atlanta will know, or can readily obtain, the recipient's computer (e.g., www.recipient.com), but will not know the recipient's Internet address or actual destination address. Nonetheless, the transport protocols will abstract the destination address from the message packet as it is transmitted across the network.

Therefore, the user in Atlanta will simply type the recipient's computer name, www.recipient.com, as the address of the destination computer. The message packet will be sent via the Internet, where the TCP/IP transport protocol will convert the computer name into a more primitive Internet address, which is a 32-bit value that identifies the host's network ID and host ID within the network, e.g., 123.456.7.8. The message packet is then routed to the corporate LAN in Seattle, where a component in the LAN, typically a server, will convert the Internet address into the destination address of the recipient's network interface card, e.g., 00AA00123456.

Meanwhile, the network interface card of the destination computer is designed to continually monitor incoming packets over the network. When the network interface card detects an incoming packet containing its destination address, the network interface card will identify itself as the intended recipient of the packet, and a communications link will be established.

In normal operations, in which both the source computer and the destination computer are operating in full power mode, all of these address conversions occur automatically and completely invisible to the user, and the communications link is readily established between the two computers. However, efforts are now being made to extend the use of network computing to power management applications, in which one or more of the computers may be operating in a low power mode. In particular, there is increasing demand for power management systems that minimize the energy consumption of computer systems, yet still allow the possibility for receiving remote communications from other computers via a network. These power management systems must provide a mechanism for "waking" a remote computer system from the network in order to receive the communications.

Generally stated, "power management" refers to a computer system's ability to conserve or otherwise manage the power that it consumes. Although power management concerns were originally focused on battery-powered portable computers, these concerns now extend to AC-powered "desktop" computer systems as well. For example, the United States government now provides strong incentives to those in the computer industry to promote energy efficiency in computers.

More particularly, power management refers to the ability to dynamically power down a computer or certain devices when they are not in use, thereby conserving energy. A computer in this condition is referred to herein as being in a "power down" state or condition. Power is then restored to the computer or devices when they are required for use. This process is often referred to as "waking" the computer.

A computer in a power down state may be in a "suspended power state" or a "hibernated power state." In general, a computer in a suspended power state is similar to a computer with all power removed, except that power to memory is maintained and dynamic RAM (DRAM) is refreshed. In addition, the operations of the computer are held in a suspended power state for a suspend operation, whereas the system loses its current operational state on a general power down.

A computer in a hibernated power state is similar to the suspended power state, except that the memory states are written to disk and the entire computer system is shut down.

Although there are several existing power management systems, most are not designed to operate in a network computing environment. Further, those that are designed to operate in a network are limited in their usefulness. For example, in one prior system for waking a computer from a local area network, a remote wake frame or "magic packet" is defined that includes the destination address repeated 16 times somewhere within the packet. While the computer is in the power down state, its network interface card continually monitors all incoming message packets for one that has its destination address repeated 16 times. When the network interface card detects an incoming packet with this address sequence, the network interface card transmits a signal to the operating system to wake the computer.

A significant limitation with this system is that a person is required to know the destination address of the remote computer that he wants to wake up in order to define the appropriate magic packet for that machine. As discussed above, this information is usually not known to a user, particularly in large wide area networks or Internet environments. Therefore, some additional mechanism, such as a dedicated server, must be provided in the network for maintaining all of the destination addresses of the computers in the network. Consequently, this system is generally limited to traditional client/server network environments.

It is not always desirable or feasible, however, to provide a dedicated server in every network. It is becoming increasingly common, for example, for modern computer systems to utilize "peer-to-peer networking," in which each connected system in the network architecture can act as both client and server. The prior system for waking a computer via a network, however, does not provide this capability.

Therefore, there is a need for an improved method and system of waking a remote computer from a network that does not require a dedicated server and is also useful in enterprise and peer networks.

There is also a need for an improved method and system of waking a remote computer from a network that integrates seamlessly into existing network environments and that does not require changes in protocol standards or software changes outside the computer.

SUMMARY OF THE INVENTION

As will be seen, the foregoing invention satisfies the foregoing needs and accomplishes additional objectives. Briefly described, the present invention provides an improved method and system for remotely waking a computer from a network. In contrast to previous systems, the method and system of the present invention is fully compatible with existing enterprise and peer network environments and does not require any changes in protocol standards.

According to one aspect of the present invention, a method of waking a computer that is in a power down state (the "sleeping computer") from a computer network is provided. The sleeping computer includes a network interface card that has a list of packets to listen for stored in memory. The method begins when an incoming packet of information is transmitted from one of the computers in the computer network to the sleeping computer. When the network interface card detects the incoming packet, it compares the incoming packet to the list of packets that it has stored in memory. If the incoming packet matches one of the packets in the list of packets stored on the network interface card, then a signal is issued to wake the sleeping computer. Otherwise, the incoming packet is discarded and the sleeping computer is not awaken.

According to another aspect of the present invention, if the incoming packet does not match any of the packets in the list of packets stored on the network interface card, then it is determined whether the incoming packet is directly addressed to the sleeping computer. If so, then a signal is issued to wake the sleeping computer. Otherwise, the incoming packet is discarded and the sleeping computer is not awaken.

According to yet another aspect of the present invention, each packet in the list of packets stored on the network interface card is designated as an ACCEPT packet or a REJECT packet. An ACCEPT packet designation indicates that the packet, when detected by the network interface card, will cause the computer to wake up and process the packet. A REJECT packet designation indicates that the packet should be discarded by the network interface card and the sleeping computer should not be awaken. Thus, if the incoming packet matches a packet in the list of packets that has been designated as an ACCEPT packet, then a signal is issued to wake the sleeping computer. On the other hand, if the incoming packet matches a packet in the list of packets that has been designated as a REJECT packet, then the incoming packet is discarded, and the sleeping computer is not awaken.

According to yet another aspect of the present invention, each packet in the list of packets stored on the network interface card has a corresponding comparison mask indicating which of the plurality of fields within the incoming packet should be compared to the list of packets. The incoming packet is effectively "filtered" using the comparison mask for each packet in the list of packets to supply a filtered incoming packet. The filtered incoming packet is then compared to the list of packets stored on the network interface card. If the filtered incoming packet matches one of the packets in the list of packets stored on the network interface card, then a signal is issued to wake the sleeping computer. Otherwise, the filtered incoming packet is discarded, and the sleeping computer is not awaken.

DETAILED DESCRIPTION

Figure 1:
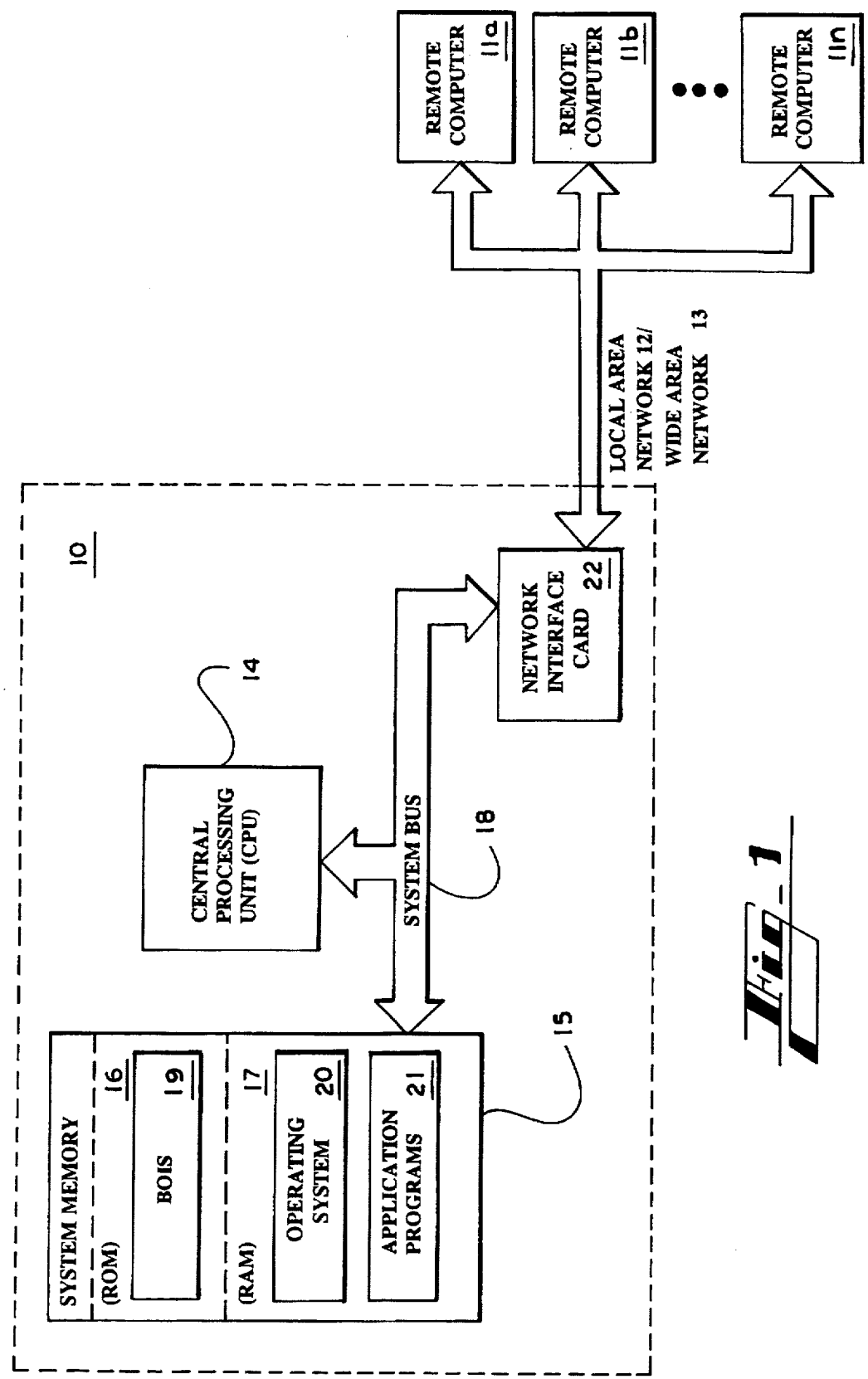
FIG. 1 is a block diagram of the operating environment of the preferred embodiment of the present invention.

Referring now to the drawing figures, in which like numerals indicate like elements or steps throughout the several views, the preferred embodiment of the present invention will be described. In general, the present invention provides an improved method and system for waking a remote computer from a network. In contrast to previous systems, the present invention described herein integrates seamlessly into existing network environments and does not require any changes in protocol standards or software changes outside the computer which incorporates the present invention. In addition, the present invention functions equally well in peer and enterprise networks.

FIG. 1 illustrates a block diagram of the preferred operating environment, a personal computer 10 embodying the system of the present invention, and which executes the steps of the methods described herein. As shown in FIG. 1, the personal computer 10 is in a networked environment with logical connections to one or more remote computers 11a–n. The logical connections between the personal computer 10 and the remote computers 11a–n are represented by a local area network 12, such as Ethernet, Token Ring, or ARCnet, and a wide area network 13, such as the Internet. It is important to note that connection to the remote computers 11a–n via both the local area network 12 and the wide area network 13 is not required, but merely illustrates alternative methods of providing a communications path between the personal computer 10 and the remote computers 11a–n.

The networked computing environment shown in FIG. 1 may be an enterprise network or client/server configuration, in which any one of the remote computers 11a–n may function as a file server or computer server. Alternatively, a peer network environment may also be utilized, in which each of the remote computers 11a–n and the personal computer 10 can act as both client and server.

The personal computer 10 includes a central processing unit (CPU) 14, such as the 80486 or "PENTIUM" microprocessors manufactured by Intel Corporation of Santa Clara, Calif. The personal computer 10 also includes system memory 15 (including read only memory (ROM) 16 and random access memory (RAM) 17), which is connected to the CPU 14 by the system bus 18. The basic input/output system (BIOS) 19 for the personal computer 10 is stored in ROM 16. Those skilled in the art will recognize that the BIOS 19 is a set of basic routines that helps to transfer information between elements within the personal computer 10.

The CPU 14 operates to execute an operating system 20 and application programs 21 desired by an operator of the system. The operating system 20 and application programs 21 can be stored within RAM 17. To simplify the representation of a general purpose computer system, conventional computer components, including computer resources such as direct memory access controller, interrupt controller, and I/O controllers, are not shown. However, it will be appreciated that CPU 14 is connected to conventional computer components via one or more system busses that support communications of control, address, and data signals between the CPU 14 and these standard computer components.

Figure 2:
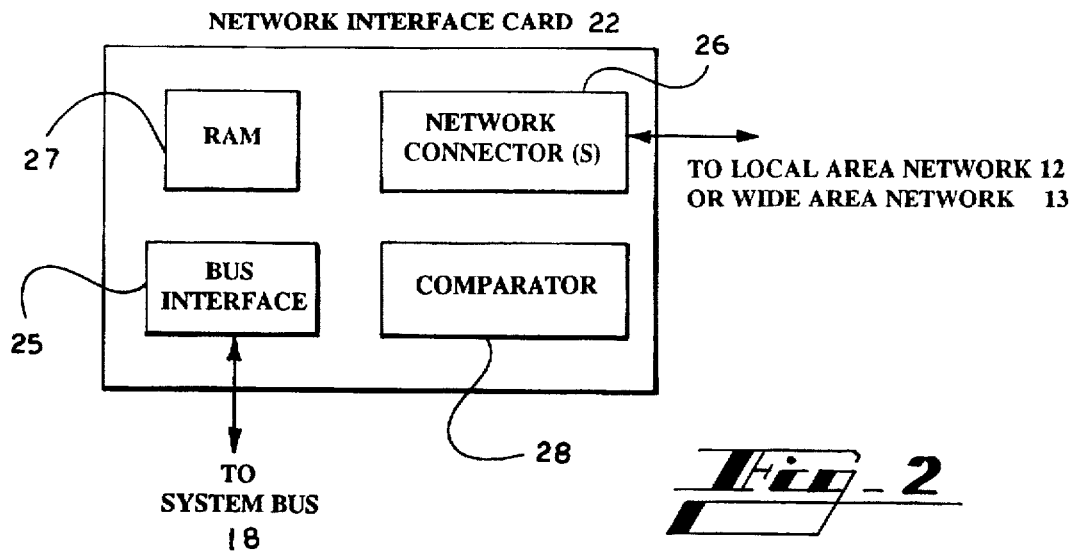
FIG. 2 is a block diagram of a network interface card constructed in accordance with the preferred embodiment of the present invention and used in the preferred operating environment shown in FIG. 1.

The personal computer 10, as well as the remote computers 11a–n, also include at least one network interface card 22 for connecting the hardware of the computers to the local area network 12 and/or wide area network 13. FIG. 2 is a more detailed block diagram illustrating the network interface card 22 constructed in accordance with the preferred embodiment of the present invention. Referring to FIGS. 1 and 2, the network interface card 22 includes a bus interface 25 for connecting to the system bus 18, and one or more network connectors 26 for connecting to the local area network 12 or wide area network 13. The network connectors 26 may comprise, for example, a conventional BNC connector assembly or an AUI connector assembly for connecting to an Ethernet or ARCnet network, or an RJ-45 connector assembly for connecting to an Ethernet or Token Ring network.

Also included on the network interface card 22 is random access memory (RAM) 27 and a comparator 28. The RAM 27 is used to store the destination address of the network interface card 22. Also stored on the RAM 27 is a list of packets that the network interface card 22 should listen for while the computer 10 is in a power down state. The creation and use of this list of packets, as well as the function of the comparator 28, will be described in more detail below.

In the preferred embodiment of the present invention, a method of waking a remote computer from the network is provided. For example, in the diagram shown in FIG. 1, a method is provided whereby the personal computer 10 is capable of waking one of the remote computers 11a–n via the local area network 12 or wide area network 13. Conversely, any one of the remote computers 11a–n may utilize the methods and systems described herein to wake the personal computer 10.

Figure 3:
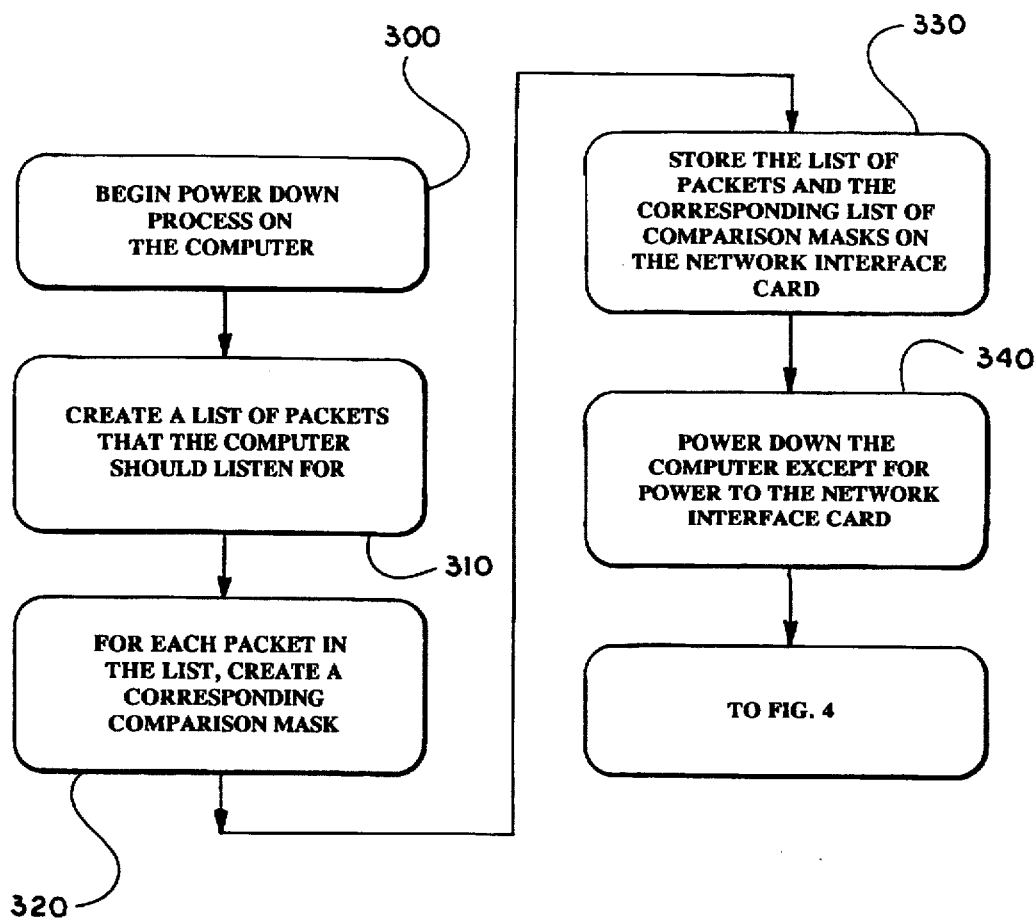
FIG. 3 is a flow chart illustrating the preferred steps of the method of placing a remote computer into a power down state so that it can thereafter be awaken by another computer via the network.

In order to wake a remote computer from the network, the remote computer must first be placed into a conventional power down state, except that power to the network interface card is maintained. FIG. 3 is a flow chart illustrating the preliminary steps of placing the remote computer, such as the remote computer 11a shown in FIG. 1, in a power down state according to the preferred embodiment of the present invention. Referring to FIGS. 1–3, at step 300 the power down process is initiated on the remote computer 11a in order to place the computer into a power down state (e.g., suspended power state or hibernated power state). The power down process may be initiated by the user of the computer, e.g., by pushing a hibernate or suspend button on the computer, or, if the remote computer is a portable computer system, by closing the lid. The power down process may also be initiated programmatically by the remote computer 11a.

After the power down process has been initiated, but before its completion, at step 310 a list of packets that the network interface card 22 should listen for while the remote computer 11a is in the power down state is created. This list of packets is created by the network components within the remote computer 11a.

In the preferred embodiment, there are actually two categories of packets that the network interface card 22 should listen for. The first category are those packets that, when detected by the network interface card 22, will cause the remote computer 11a to wake up in order to process the incoming packet. The packets within this category are designated as "ACCEPT" packets, indicating that the network interface card 22 will accept those packets and wake up the remote computer 11a to process the packet. Common examples of ACCEPT packets are address resolution protocol (ARP) requests, NetBIOS name lookups, which are both well known in the art, and any packets that are directly addressed to the remote computer 11a.

The second category of packets are those that should be discarded by the network interface card 22, even if the packet is directly addressed to the remote computer 11a. The packets within this second category are designated as "REJECT" packets, indicating that the network interface card 22 should discard those packets when detected and should not wake up the remote computer 11a. One example of the type of packet that will often be designated as a REJECT packet are browse master election packets, which are well known in the art.

Each packet in the resulting list is formatted as a request for the remote computer 11a. For example, in a remote computer MYCOMPUTER that has connections to networks that use the NetBEUI, TCP/IP, and IPX protocols, a list of packets that the network interface card 22 should listen for may look as follows:

* Accept NetBIOS lookup of MYCOMPUTER on NetBEUI
* Accept NetBIOS lookup of MYCOMPUTER on TCP/IP
* Accept NetBIOS lookup of MYCOMPUTER on IPX
* Accept Lookup of MYCOMPUTER on direct host IPX
* Accept ARP of 157.54.130.48
* Reject browse master elections in domain SYS-WIN4

As is well known in the art, data packets contain many different fields, and the fields within a particular packet will vary depending on the transport protocol that sent the packet. For example, the header of one type of Ethernet data packet contains the following fields:

(1) a Preamble;
(2) the Destination address;
(3) the Source address; and
(4) a Type field (indicating the type of application for which the data is formatted).

In contrast, the header in an IPX packet includes a different set of fields:

(1) a Checksum;
(2) Length of packet;
(3) Transparent Control;
(4) Packet Type;
(5) Destination network;
(6) Destination host;
(7) Destination socket;
(8) Source network;
(9) Source host; and
(10) Source socket.

Those skilled in the art will appreciate that many of the fields in a data packet will include information that is not relevant for purposes of determining whether the packet should be processed by the computer. For example, the source address field that is present in most data packets is typically not of interest. Therefore, in addition to the list of packets that the network interface card 22 should listen for, a "comparison mask" is created at step 320 for each packet in the list. The comparison masks are used to filter out any irrelevant fields in the incoming data packets, such as the source address field. The comparison masks may be comparison bit masks, where every bit in the packet is represented, or comparison byte masks, in which only the bytes within the packet are represented. The function of the comparison masks will be explained in greater detail below.

At step 330, the list of packets and its corresponding list of comparison masks are provided to the network interface card 22, where they are stored in RAM 27 on the network interface card 22.

At step 340, the power down process is completed by placing the remote computer 11a into the power down mode, but power to the network interface card 22 is maintained. While the remote computer 11a is in the power down mode, the network interface card 22 continually listens for incoming packets as it does in normal operation.

Figure 4:
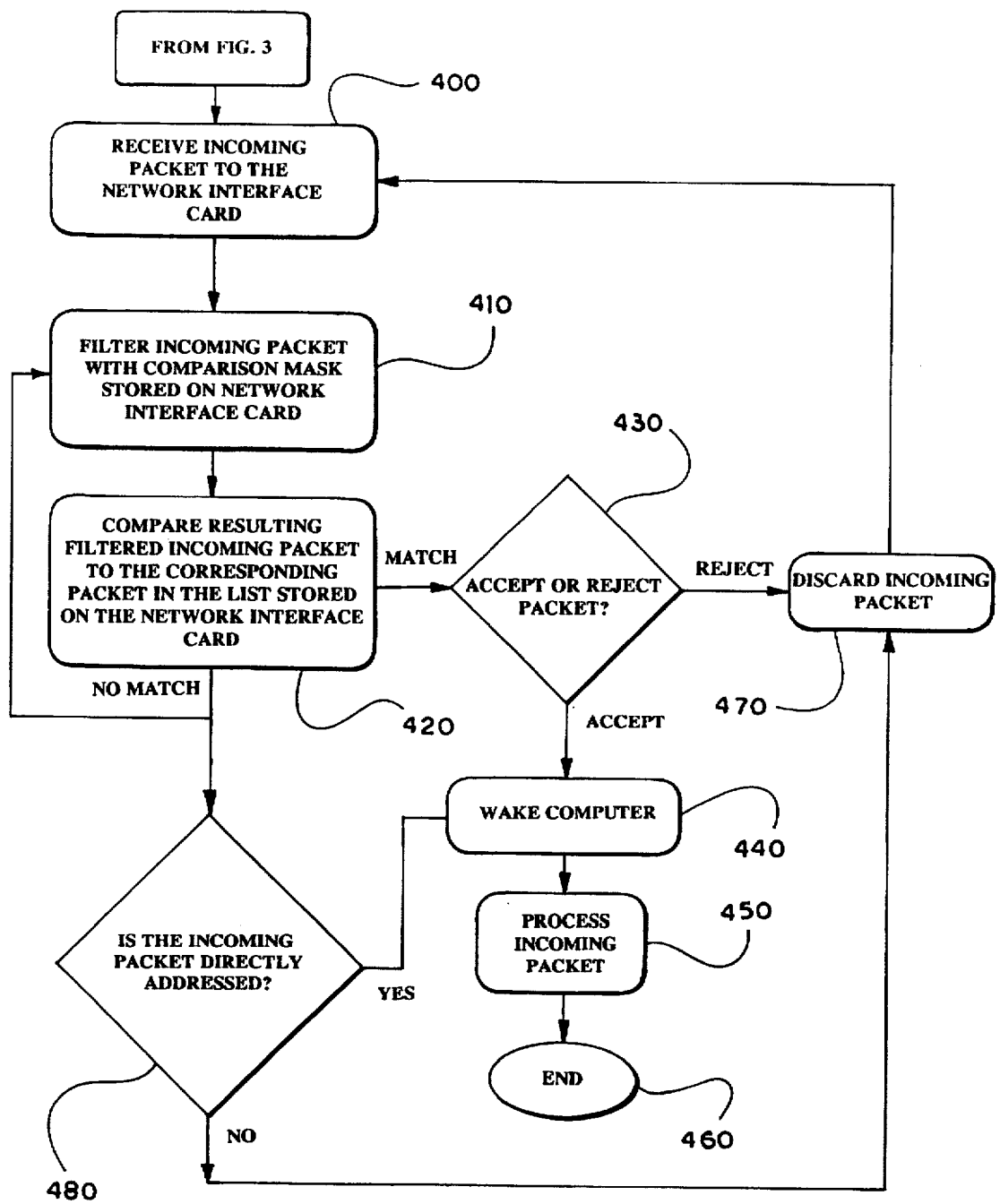
FIG. 4 is a flow chart illustrating the preferred steps of the method of waking a remote computer from a power down state from the network.

With the remote computer 11a now in a power down mode, the preferred embodiment provides an improved method of waking the remote computer from the network. FIG. 4 is a flow chart illustrating the steps of the method of waking the remote computer 11a from a network according to the preferred embodiment of the present invention (where it is assumed that the remote computer 11a has been placed into the power down condition in accordance with the steps described above in connection with FIG. 3).

Referring to FIGS. 1, 2 and 4, at step 400 the network interface card 22 of the remote computer 11a detects an incoming packet over the network. At step 410 the incoming packet is "filtered" with the comparison mask corresponding to the first packet in the list to produce a filtered incoming packet. The purpose and effect of this step will be described in more detail below.

At step 420, the comparator 28 of the network interface card 22 compares the filtered incoming packet to the first packet in the list stored on the RAM 27. If the filtered incoming packet matches the corresponding packet in the list, then at step 430, it is determined whether the packet in the list is designated as an "ACCEPT" packet or a "REJECT" packet.

If the packet has been designated as an "ACCEPT" packet, then at step 440, the network interface card 22 sends a signal to the operating system in order to wake the remote computer 11a via conventional mechanisms. At step 450, the incoming packet is then processed by the operating system, and the routine ends at step 460.

If, on the other hand, at step 430, the packet has been designated as a "REJECT" packet, then at step 470, the network interface card 22 will discard the incoming packet, and the routine returns to step 400 where the network interface card 22 will listen for another incoming packet.

Referring back to step 420, if the filtered incoming packet does not match the corresponding packet in the list, then the process returns to step 410, where the incoming packet is filtered with the comparison mask corresponding to the next packet in the list. The resulting filtered packet is then compared to the second packet in the list at step 420. If the filtered incoming packet matches the corresponding packet in the list, then the process moves to step 430, as described above. Otherwise, the process returns to step 410 until the incoming packet has been filtered and compared to every packet in the list.

Those skilled in the art will appreciate that there are three different types of data packets: (1) broadcast packets, which are packets that are addressed to every computer in the network; (2) multicast packets, which are packets that are addressed to more than one, but not all, of the computers in the network; and (3) directly addressed packets, which are packets that are addressed to a specific computer only. In normal operations, the network interface card 22 issues an interrupt to handle every broadcast packet. However, the majority of broadcast packets are intended for servers, not clients. Therefore, most of the time that a client spends looking at broadcast packets is a waste of time. In the preferred embodiment, broadcast packets are only processed if they have been designated as an ACCEPT packet, thereby conserving limited CPU time and improving system performance.

Referring back to step 420, if none of the resulting filtered incoming packets match any of the packets in the list stored on the network interface card 22, then at step 480, it is determined whether the incoming packet is directly addressed to the remote computer 11a. Directly addressed packets are handled differently than broadcast packets. In the preferred embodiment, any incoming packet that is directly addressed to the remote computer 11a that is in the power down state will be processed by the computer, unless the incoming packet has been specifically designated as a "REJECT" packet.

Therefore, if at step 480, the incoming packet is directly addressed to the remote computer 11a, then at step 440 the network interface card 22 issues a signal to the operating system in order to wake up the computer via conventional mechanisms. The incoming packet is then processed by the operating system at step 450, and the routine ends at step 460.

On the other hand, if at step 480 the incoming packet is not directly addressed to the remote computer 11a (i.e., it is a broadcast packet or a multicast packet), then the network interface card 22 will discard the incoming packet at step 470, and the routine returns to step 400 where the network interface card 22 will listen for another incoming packet.

Having now described the overall process of the preferred embodiment, the step of "filtering" the incoming packet with the comparison masks will now be described in more detail. As previously discussed, the particular fields within any incoming packet will vary depending on the transport protocol used for the communications, and many of those fields will not be of interest to the remote computer at the receiving end of the communication (e.g., the source address field). Therefore, rather than comparing every field of the incoming packet to the list of packets on the network interface card 22, the incoming packet is filtered with the comparison masks so that only those fields of the incoming packet that are indicated as being of relevance by the particular comparison mask are used in the comparison.

For example, consider the hypothetical situation shown below:

| | | | | | | | | | | |
|---|---|---|---|---|---|---|---|---|---|---|
| Packet in the list: | 00 | 00 | 00 | 04 | 05 | 06 | 07 | 00 | 00 | 00 |
| Comp. Mask for above packet: | 00 | 00 | 00 | 07 | FF | FF | FF | 00 | 00 | 00 |
| Incoming packet: | 01 | 02 | 03 | 34 | 05 | 06 | 07 | 08 | 09 | 0A |

In the table shown above, the digits in the table each represent four bits. Each "0" in the table represents 0000, "F" represents 1111, "A" represents 1010, etc. A '0' bit in the comparison mask indicates that the corresponding field in the incoming packet should be ignored for purposes of the comparison, while a '1' bit indicates that the corresponding field is relevant and should be used in the comparison. Thus, the first nonzero byte in the comparison mask above is 07, which represents 0000 0111. This means that only the last 3 bits should be considered. Looking at the corresponding bytes in the packet list (04=0000 0100), and the incoming packet (34=0011 0100), it can be seen that the last three bits do indeed match, even though the bytes themselves (04 and 34) do not. Thus, bytes 34, 05, 06 and 07 of the incoming packet match bytes 04–07 of the packet in the list.

Thus, the methods and systems described herein provide an improved method of waking a remote computer from the network. Unlike previous systems, the system described herein operates independently of the type of networks and transport protocols utilized. Further, the network interface cards of the present invention will function seamlessly with existing remote administration tools.

Using the methods and systems of the preferred embodiment provides many useful benefits to users by permitting the use of energy-saving features of power management in a network environment while still allowing communications between computers in the network. For example, by using the methods and systems described herein, a user can make backups or remotely manage client computers in off hours without requiring users to leave their computers on.

The present invention has been described in relation to particular embodiments which are intended in all respects to be illustrative rather than restrictive. Alternative embodiments will become apparent to those skilled in the art to which the present invention pertains without departing from its spirit and scope. For example, although the present invention has been described in accordance with a remote computer in a power down mode, it will be appreciated that the systems and principles described herein may also be useful in a computer that is operating in full power mode by having the network interface card send an interrupt only when it receives a packet that the computer needs to process. Moreover, the present invention has been described in accordance with waking a personal computer. However, the design described herein equally applies to any other computers, servers, network peripherals or network servers. Accordingly, the scope of the present invention is defined by the appended claims rather than the foregoing discussion.

What is claimed is:

1. In a computer network including a plurality of interconnected computers, one of said computers being a sleeping computer in a power down state, a method of waking the sleeping computer from the computer network, said method comprising the steps of:

storing on a network interface card associated with the sleeping computer a list of packets to listen for while the sleeping computer is in the power down state;

transmitting an incoming packet of information from one of said plurality of computers in the computer network to the sleeping computer;

detecting the incoming packet in the network interface card associated with the sleeping computer;

comparing the incoming packet to the list of packets stored on the network interface card;

if the incoming packet matches one of the packets in the list of packets stored on the network interface card, then waking the sleeping computer and processing the incoming packet; and otherwise, discarding the incoming packet.

2. The method of claim 1, further comprising the step of:

if the incoming packet does not match any of the packets in the list of packets stored on the network interface card, then determining whether the incoming packet is directly addressed to the sleeping computer;

if the incoming packet is directly addressed to the sleeping computer, then waking the sleeping computer and processing the incoming packet; and otherwise, discarding the incoming packet.

3. The method of claim 1, wherein each packet in the list of packets is designated as an ACCEPT packet or a REJECT packet; and in response to a determination that one of the packets in the list of packets matches the incoming packet, further comprising the steps of:

determining whether the packet in the list of packets that matches the incoming packet is an ACCEPT packet or a REJECT packet;

if the packet in the list of packets that matches the incoming packet is an ACCEPT packet, then waking the sleeping computer and processing the incoming packet; and if the packet in the list of packets that matches the incoming packet is a REJECT packet, then discarding the incoming packet.

4. The method of claim 1, wherein said incoming packet includes a plurality of fields; and wherein each packet in the list of packets has a corresponding comparison mask indicating which of the plurality of fields within the incoming packet should be compared to the list of packets stored on the network interface card.

5. The method of claim 4, in response to the detection of the incoming packet, further comprising the steps of:

filtering the incoming packet with the comparison mask for each packet in the list of packets to supply a plurality of filtered incoming packets;

comparing the plurality of filtered incoming packets to the list of packets stored on the network interface card;

if any of the plurality of filtered incoming packets matches one of the packets in the list of packets stored on the network interface card, then waking the sleeping computer and processing the incoming packet; and otherwise, discarding the incoming packet.

6. The method of claim 5, wherein said comparison mask for each packet in the list comprises a plurality of bits.

7. The method of claim 5, wherein said comparison mask for each packet in the list comprises a plurality of bytes.

8. A computer, comprising:

a central processing unit;

a first memory storage area connected to said central processing unit, said first memory storage area storing an operating system;

a network interface card connected to said central processing unit, said network interface card having a second memory storage area for storing a list of packets to listen for while the computer is in a power down state, each packet in the list of packets having a corresponding comparison mask;

said network interface card responsive to commands from the computer to:

detect an incoming packet of information, said incoming packet including a plurality of fields;

compare the incoming packet to the list of packets;

if the incoming packet matches any of the packets in the list of packets stored on the network interface card, then transmit a predetermined signal to the operating system operative to wake the computer from the power down state; and otherwise, discard the incoming packet.

9. The computer of claim 8, wherein said network interface card is further operative to:

if none of the packets in the list of packets stored on the network interface card match the incoming packet, then determine whether the incoming packet is directly addressed to the computer;

if the incoming packet is directly addressed to the computer, then transmit the predetermined signal to the operating system; and otherwise, discard the incoming packet.

10. The computer of claim 9, wherein each packet in the list of packets stored on the network interface card has a corresponding comparison mask indicating which of the plurality of fields within the incoming packet should be compared to the list of packets.

11. The computer of claim 10, wherein said network interface card, in response to the detection of the incoming packet of information, is further responsive to:

filter the incoming packet with the comparison mask for each packet in the list of packets to supply a plurality of filtered incoming packets;

compare the plurality of filtered incoming packets to the list of packets stored on the network interface card;

if any of the plurality of filtered incoming packets matches one of the packets in the list of packets stored on the network interface card; then transmit the predetermined signal to the operating system; and otherwise, discard the incoming packet.

12. The computer of claim 8, wherein each packet in the list of packets is designated as an ACCEPT packet or a REJECT packet; and in response to a determination that one of the packets in the list of packets matches the incoming packet, said network interface card is further responsive to:

determine whether the packet in the list of packets that matches the incoming packet is an ACCEPT packet or a REJECT packet;

if the packet in the list of packets that matches the incoming packet is an ACCEPT packet, then transmit the predetermined signal to the operating system; and if the packet in the list of packets that matches the incoming packet is a REJECT packet, then discard the incoming packet.

13. A network interface card for providing an interface between a computer and a network, said network interface card comprising:

a bus interface for connecting to a system bus associated with the computer;

a connector for connecting to the network;

a memory storage area, said memory storage area storing a list of packets to listen for while the computer is in a power down state; and a comparator for comparing an incoming packet to the list of packets stored in the memory storage area, said incoming packet including a plurality of fields;

wherein if the incoming packet matches one of the packets in the list of packets stored in the memory storage area, then said network interface card is operative to transmit a predetermined signal to the computer operative to wake the computer from the power down state;

otherwise, said network interface card is operative to discard the incoming packet.

14. The network interface card of claim 13, wherein if the incoming packet does not match any of the packets in the list of packets stored in the memory storage area, then the network interface card is further operative to:

determine whether the incoming packet is directly addressed to the computer; and if the incoming packet is directly addressed to the computer, transmit the predetermined signal to the computer;

otherwise, discard the incoming packet.

15. The network interface card of claim 13, wherein each packet in the list of packets stored in the memory storage area is designated as an ACCEPT packet or a REJECT packet; and in response to a determination that one of the incoming packets in the list of packets stored in the memory storage area matches the incoming packet, then the network interface card is further operative to:

determine whether the packet in the list of packets that matches the incoming packet is an ACCEPT packet or a REJECT packet;

if the packet in the list of packets that matches the incoming packet is an ACCEPT packet, then transmit the predetermined signal to the operating system; and if the packet in the list of packets that matches the incoming packet is a REJECT packet, then discard the incoming packet.

16. The network interface card of claim 13, wherein each packet in the list of packets stored in the memory storage area includes a corresponding comparison mask indicating which of the plurality of fields within the incoming packet should be compared to the list of packets.

17. The network interface card of claim 16, wherein said comparator is operative to:

filter the incoming packet with the comparison mask for each packet in the list of packets to supply a plurality of filtered incoming packets;

compare the plurality of filtered incoming packets to the list of packets stored on the network interface card;

if any of the plurality of filtered incoming packets matches one of the packets in the list of packets stored on the network interface card; then transmit the predetermined signal to the operating system; and otherwise, discard the incoming packet.

* * * * *